United States Patent Office 3,767,670
Patented Oct. 23, 1973

3,767,670
1-R₁-3-(3-PHTHALIMIDO-ALKYLOXY)-5-
OR-6-R-1H-INDAZOLE COMPOUNDS
Ctirad Podesva, Montreal, Quebec, and William T. Scott,
Ville-de-Lery, Quebec, Canada, assignors to Delmar
Chemicals Limited, Ville La Salle, Quebec, Canada
No Drawing. Filed Nov. 30, 1971, Ser. No. 203,456
Int. Cl. C07d 49/18
U.S. Cl. 260—310 C         8 Claims

ABSTRACT OF THE DISCLOSURE

This invention provides phthalimido compounds of the following general formula:

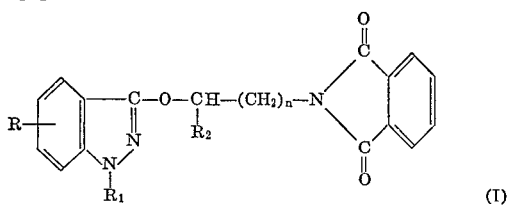

wherein R represents a hydrogen or halogen atom; $R_1$ represents an alkyl group, a substituted or unsubstituted aryl group or a substituted or unsubstituted aralkyl group; $R_2$ represents a hydrogen atom or an alkyl group and $n$ is an integer no greater than 6 and processes for making them. Such compounds are useful in making a novel class of primary and secondary amino-indazole compounds which are themselves biologically active as well as being readily convertable into a known class of tertiary amino-indazole compounds of established utility in chemotherapy.

BACKGROUND OF THE INVENTION

This invention relates to novel phthalimido compounds and to processes for making them. More particularly, the invention is concerned with novel phthalimido compounds of the following general formula:

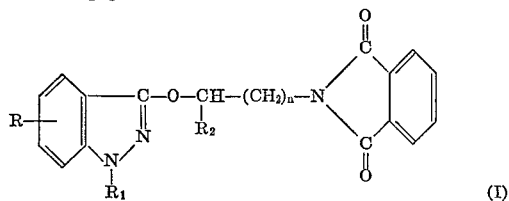

wherein R represents a hydrogen or halogen atom; $R_1$ represents an alkyl group, a substituted or unsubstituted aryl group or a substituted or unsubstituted aralkyl group; $R_2$ represents a hydrogen atom or an alkyl group and $n$ is an integer no greater than 6.

As described in the specification of our co-pending application Ser. No. 203,477 such phthalimido compounds are useful in making a novel class of primary and secondary amino-indazole compounds of the following general formula:

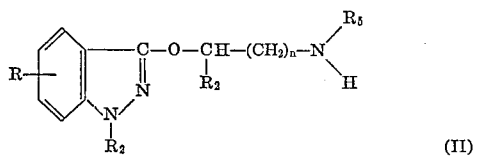

wherein R, $R_1$, $R_2$ and $n$ have the same significance as previously and $R_5$ represents a hydrogen atom, an alkyl group or an aralkyl group. As described in the aforementioned specification, these primary and secondary amino-indazoles and salts thereof possess biological properties in that when subjected to standard pharmacological evaluation in mice, they show antiinflammatory and analgesic activity. Such compounds, therefore, may be expected to have ultimate potential utility as antiinflammatory and/or analgesic agents. Aside from this potential ultimate utility as medicaments, the primary and secondary amino-indazoles of the foregoing General Formula II are also useful as intermediates in making a known class of compounds which are tertiary amino-indazoles of the following general formula:

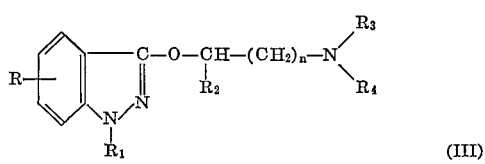

wherein R, $R_1$, $R_2$ and $n$ have the same significance as previously and $R_3$ and $R_4$, which may be the same or different, each represent an alkyl or aralkyl group. Processes for making such tertiary amino-indazole compounds and salts thereof, utilizing the phthalimido compounds of this invention and proceeding through the primary or secondary amino-indazoles of the aforementioned co-pending application are described and claimed in the specification of our co-pending application Ser. No. 197,985 filed concurrently herewith. Tertiary amino-indazole compounds of the General Formula II are known to be pharmacologically active in that they manifest significant analgesic, antiinflammatory and myorelaxing effects. Probably the best known of such compounds at the present time is 1-benzyl-3-[3-(dimethylamino)-propoxy] - 1H - indazole, commonly referred to as benzydamine, which, in the form of the hydrochloride salt is employed in chemotherapy as an analgesic, antipyretic and/or antiinflammatory agent. In this role, the benzydamine hydrochloride is associated in pharmaceutical compositions with pharmaceutically acceptable organic or inorganic, solid or liquid carriers.

DESCRIPTION OF THE INVENTION

According to this invention in its composition of matter aspect there are provided novel phthalimido compounds of the following general formula:

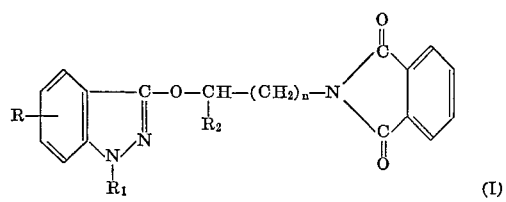

wherein R, $R_1$, $R_2$ and $n$ have the same significance as previously. A preferred class of phthalimido compounds of the foregoing General Formula I are those in which:

R represents a hydrogen or chlorine atom;
$R_1$ represents a lower aralkyl group such, for example, as benzyl;
$R_2$ represents a hydrogen atom or a lower alkyl group; and
$n$ is 1 or 2.

A highly preferred class of compounds are 1-benzyl-3-(3-phthalimidopropoxy)-5-or-6-R - 1H - indazole compounds such, for instance, as 1-benzyl-3-(3-phthalimidopropoxy)-1H-indazole, 1-benzyl - 3 - (3-phthalimidopropoxy)-5-chloro-1H-indazole, 1 - benzyl-3-(3-phthalimidopropoxy)-6-chloro-1H-indazole and the acid addition salts thereof.

According to this invention in its process aspect there is provided a process for making the phthalimido compounds of the foregoing General Formula I which comprises reacting a compound of the following general formula:

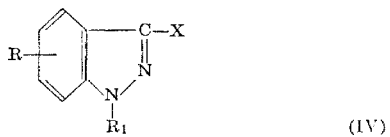
(IV)

with a compound of the following general formula:

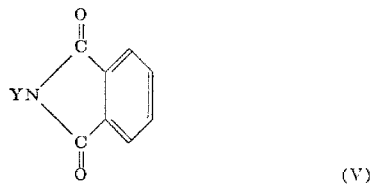
(V)

wherein R and $R_1$ have the same significance as previously, and X in Formula IV represents an —OM grouping in which M stands for a hydrogen atom or a monovalent cation when Y in Formula V represents a

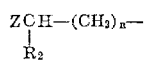

grouping in which $R_2$ and $n$ have the same significance as previously and Z stands for a leaving group such as a halogen atom and X in Formula IV represents an

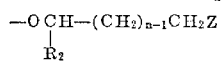

grouping in which $R_2$, $n$ and Z have the same significance as previously when Y in Formula V represents a hydrogen atom or a monovalent cation. Preferably the monovalent cation is an alkali metal cation such as sodium or potassium and Z is a chlorine atom.

In a preferred process for making the phthalimido compounds of the General Formula I, a compound of the following general formula:

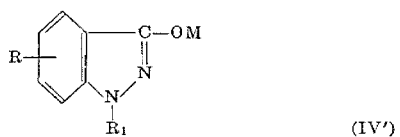
(IV')

in which R, $R_1$ and M have the same significance as previously is condensed with a compound of the following general formula:

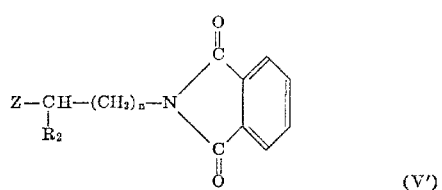
(V')

wherein Z, $R_2$ and $n$ have the same significance as previously. Conveniently, the 1-$R_1$-3-hydroxy-R-1H-indazole reactant of the General Formula IV' is used in the form of an alkali metal salt thereof such, for example, as sodium or potassium salt (i.e. M≡Na or K), and the N-(3-haloalkyl)-phthalimide reactant of the General Formula V' is an N-(3-chloro-lower alkyl)-phthalimide.

The condensation reaction is preferably carried out in a medium of an organic solvent that is inert to both reactants. Exemplary of suitable inert organic solvents are hydrocarbons such as benzene, toluene or xylene, ether-type liquids such as ether, dioxane or tetrahydrofuran, chlorinated hydrocarbons such as chloroform, methylene chloride or ethylene chloride, lower aliphatic alcohols such as methanol or ethanol, lower aliphatic ketones containing no more than 6 carbon atoms such as acetone or methylethyl ketone and carboxylic acid amides such as N,N-dimethyl formamide. Advantageously, the inert organic solvent is a high boiling aromatic solvent or an anhydrous dipolar aprotic solvent such, for example, as anhydrous N,N-dimethylformamide, anhydrous N,N-dimethyl sulfoxide, anhydrous tetrahydrofuran, anhydrous N,N-dimethyl acetamide and anhydrous acetonitrile. The temperature at which this condensation is conducted is not critical but best yields are usually obtained when the reaction is conducted at elevated temperatures such, for example, as between 50° and 150° C. which, therefore, are preferred. In certain instances, it may be convenient to conduct the reaction at the reflux temperature of the particular solvent medium when the condensation reaction is usually completed in a few hours. Preferably, equimolecular amounts of the reactants are used. An excess of one or another reactant is not usually harmful to the course of the reaction, but it can render the isolation of the final product more tedious and therefore often does not serve any useful purpose. The reaction products are typically obtained in the form of well defined crystalline materials which can be readily isolated from the reaction mixture by any convenient standard procedure. If desired, the product may be purified, for example, by recrystallization from an appropriate solvent such, for example, as methanol, ethanol or acetone or by chromatography.

The N-(haloalkyl)-phthalimides of the foregoing General Formula V' are known compounds that can be readily obtained following standard procedures. For example, such compounds may be prepared by condensing an alkali metal phthalimide, say, sodium or potassium phthalimide with an appropriate dihaloalkane such, for example, as 1,3-dibromopropane or ethylene dichloride conveniently using an excess of the dihaloalkane as solvent and conducting the reaction at the reflux temperature thereof. In an alternative and preferred procedure which affords the desired N-(haloalkyl)-phthalimide in excellent yield, an amino-alcohol, say, 1-amino-3-propanol or amino-ethanol is reacted with phthalic anhydride in an inert organic solvent such as benzene, toluene or xylene usually at an elevated temperature, say, reflux, and the hydroxy group in the resulting N-(hydroxyalkyl)-phthalimide converted into halogen by standard procedures, say, using phosphorus pentachloride or thionyl chloride.

Likewise representative 3-hydroxy-1H-indazole compounds of the foregoing General Formula IV' are known, being described, for instance in Beilstein, vol. XXIV, p. 113, and all may be readily obtained by standard procedures. For example, such compounds may be prepared from N-substituted anthranilic acid or esters of the General Formula X; the latter compounds are nitrosated, and the corresponding nitroso compounds reduced, with an alkali metal hydrosulfite, say, sodium or potassium hydrosulfite, to yield the alkali metal, say, the sodium or potassium salt respectively of 3-hydroxy-1H-indazole directly. This procedure is illustrated in the following flow sheet:

FLOW SHEET I

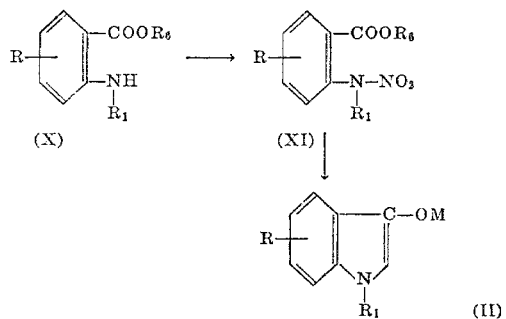

In the reaction sequence shown in Flow Sheet I, R, $R_1$ and M have the same significance as previously and $R_6$ represents hydrogen or alkyl, preferably lower alkyl.

An alternative procedure for preparing the 3-hydroxy-1H-indazole compounds is basically similar to that described in Organic Synthesis Collective, vol. 3, pp. 475–479 starting from an anthranilic acid and proceeding through a diazonium salt, which is converted into an o-hydrazino benzoic acid hydrochloride which, in turn, is cyclized into the 3-hydroxy-1H-indazole compound.

An advantageous process for making the preferred class of compounds, namely 1 - benzyl - 3-(3-phthalimidopropoxy)-5 or 6-R-1H-indazoles, involves the reaction of equimolecular amounts of the corresponding 1-benzyl-3-hydroxy-1H-indazole in the form of an alkali metal salt, say, the sodium or potassium salt thereof, and an N-(3-halopropyl)-phthalimide, preferably N-(3-chloropropyl)-phthalimide. Conveniently, this reaction is conducted in an inert organic solvent such as a high boiling aromatic solvent like benzene or toluene, or a dipolar aprotic solvent like N,N-dimethylformamide or tetrahydrofuran. The temperature at which the reaction is conducted is not critical but the best yields are generally obtained when the reaction is conducted at elevated temperatures such, for example, as 60° to 150° C. When the solvent is N,N-dimethylformamide, the reaction is conveniently conducted at around 100° C. The 1-benzyl-3-(3-phthalimidopropoxy) - 6R - 1H-indazole compound is usually obtained as a crystalline solid which may be readily isolated from the reaction mixture by known procedures. It may be purified by recrystallization from an organic solvent such as methanol, ethanol or acetone, or by chromatography. This process is depicted schematically in the following flow sheet:

FLOW SHEET II

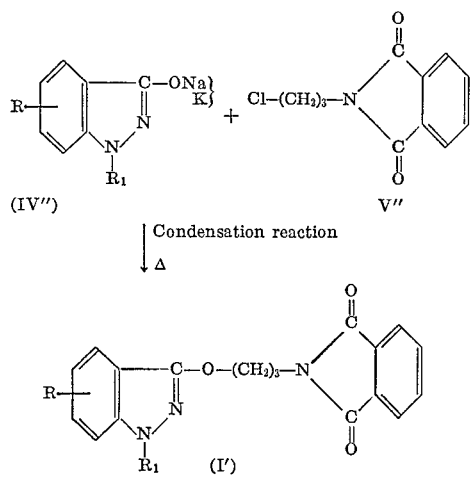

The invention will be more completely understood from the specific examples which follow. These examples are set forth by way of illustrating compounds of this invention and of the procedure for their preparation and it will be understood that the invention is not to be construed as limited in spirit or scope by the details contained therein, as many modifications in materials and procedures will be readily apparent to those skilled in the art. In these examples, the melting point data is uncorrected and was obtained by the capillary tube method, and all temperatures are in degrees centigrade.

EXAMPLE 1

1-benzyl-3-(3-phthalimidopropoxy)-1H-indazole 2.7 gms. (0.05 mole) of sodium methoxide were added slowly in small portions to 11.2 gms. (0.05 mole) of 1-benzyl - 3 - hydroxy - 1H - indazole in 60 mls. of anhydrous N,N-dimethyl formamide, as solvent. Thereafter, 11.2 gms. (0.05 mole) of 1-chloro - 3 - phthalimidopropane were added to the solution which was heated overnight at 100°. The reaction mixture was then cooled to room temperature and the precipitated sodium chloride was removed by filtration. The clear filtrate was diluted with cold water and extracted three times with benzene.

The combined organic extracts were washed twice with 5% aqueous sodium hydroxide solution, then with water and finally dried over sodium sulfate. The benzene was evaporated-off to give 19.5 gms. (yield=95%) of the desired product in the form of an off-white crystalline solid.

An analysis sample was prepared by recrystallization from methanol. Melting point: 78°–80°.

*Elementary analysis.*—Calcd. for $C_{25}H_{21}N_3O_3$ (percent): C, 72.98; H, 5.15; N, 10.21. Found (percent): C, 73.09; H, 5.21; N, 10.20.

Infra-red: The infra-red absorption spectrum showed characteristic absorptions attributable to the carbonyl groups at 1770 cm.$^{-1}$ and 1712 cm.$^{-1}$.

The 1-chloro - 3 - phthalimidopropane starting compound was obtained by the following procedure:

89.25 gms. (0.075 mole) of thionyl chloride and 10 mls. of pyridine were added to a solution comprising 102.6 gms. (0.5 mole) of 1-hydroxy - 3 - phthalimidopropane, itself obtained by the reaction of equimolar amounts of phthalic anhydride and 3-aminopropanol, in 250 mls. of benzene. This solution was refluxed for 3 hours, then cooled to room temperature and some cold water added whereupon the mixture separated into an organic and an aqueous phase. The layers were separated and the aqueous phase extracted with 25 mls. of benzene. The combined benzene extracts were washed twice with sodium bicarbonate solution, dried over sodium sulfate and evaporated to leave 94.6 gms. (84.7% yield) of a reddish brown oil as the residue which upon scratching solidified. 100 mls. of isopropanol were added to the product which was kept at 0°–5° with stirring overnight after which the product, an off-white crystalline solid was recovered by filtration and dried. Melting point: 66°–69°.

EXAMPLE 2

1-p-methoxybenzyl-3-(3-phthalimidopropoxy)-1H-indazole

This compound was prepared following a similar procedure to that set forth in the preceding example by reacting together the sodium salt of 1-p-methoxybenzyl-3-hydroxy - 1H - indazole and 1-chloro-3-phthalimidopropane. Melting point: 124°–126°.

*Elementary analysis.*—Calcd. for $C_{26}H_{23}N_3O_4$ (percent): C, 70.73; H, 5.25; N, 9.52. Found (percent): C, 71.05; H, 5.42; N, 9.44.

Infra-red: The infra-red absorption spectrum showed characteristic absorptions attributable to the carbonyl groups at 1770 cm.$^{-1}$ and 1712 cm.$^{-1}$.

While in the foregoing specification various embodiments of this invention have been set forth and specific details elaborated upon for the purpose of illustration, it will be apparent to those skilled in the art that this invention is susceptible to other embodiments and that many of the details may be varied widely without departing from the spirit and scope of the invention as defined in the appended claims.

What is claimed is:

1. A phthalimido compound of the following formula:

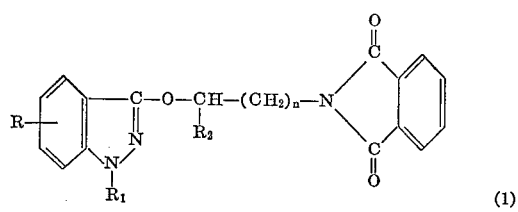

wherein R represents hydrogen or halogen; $R_1$ represents benzyl or p-methoxybenzyl; $R_2$ represents hydrogen; and $n$ is an integer no greater than 6.

2. A compound as claimed in claim 1, in which: R represents hydrogen or chlorine; and $n$ is 1 or 2.

3. A compound as claimed in claim 1 which is 1-p-methoxybenzyl-3-(3-phthalimidopropoxy)-1H-indazole.

4. A 1-benzyl - 3 - (3-phthalimidopropoxy) - 5R - 1H-indazole compound wherein R is hydrogen or a halogen.

5. A 1-benzyl - 3 - (3-phthalimidopropoxy) - 6R - 1H-indazole compound wherein R is hydrogen or halogen.

6. 1-benzyl - 3 - (3-phthalimidopropoxy) - 5 - chloro-1H-indazole.

7. 1-benzyl - 3 - (3-phthalimidopropoxy) - 6 - chloro-1H-indazole.

8. 1-benzyl-3-(3-phthalimidopropoxy)-1H-indazole.

References Cited

FOREIGN PATENTS 739,485   7/1966   Canada _____ 260—310 C

OTHER REFERENCES

Sato et al.: Chem. Abst., vol. 56, column 1443 (1962).

NATALIE TROUSOF, Primary Examiner

U.S. Cl. X.R.

260—326, 471 R, 997